(12) United States Patent
Lungu

(10) Patent No.: US 6,359,360 B1
(45) Date of Patent: Mar. 19, 2002

(54) ELECTRONICALLY SWITCHED TWO PHASES RELUCTANCE MACHINE

(76) Inventor: Iancu Lungu, Str. Trapezului nr. 5 G1A ap-40, sector 3, RO-74381 Bukarest (RO)

( * ) Notice: Subject to any disclaimer, the term of this patent is extended or adjusted under 35 U.S.C. 154(b) by 0 days.

(21) Appl. No.: 09/308,528
(22) PCT Filed: Nov. 19, 1997
(86) PCT No.: PCT/RO97/00007
§ 371 Date: Dec. 24, 1999
§ 102(e) Date: Dec. 24, 1999
(87) PCT Pub. No.: WO98/23024
PCT Pub. Date: May 28, 1998

(30) Foreign Application Priority Data

Nov. 20, 1996 (RO) ............................................ 96-02188

(51) Int. Cl.[7] .......................... H02K 17/00; H02K 17/42
(52) U.S. Cl. ...................................... 310/168; 310/171
(58) Field of Search ................................ 310/166, 168, 310/49 R, 254, 171, 112

(56) References Cited

U.S. PATENT DOCUMENTS

| | | | |
|---|---|---|---|
| 3,857,078 A | 12/1974 | Sawyer | 318/608 |
| 4,501,980 A | 2/1985 | Welburn | 310/12 |
| 4,584,513 A | 4/1986 | Freise et al. | 318/701 |
| 5,015,903 A | * 5/1991 | Hancock et al. | 310/168 |

FOREIGN PATENT DOCUMENTS

| | | |
|---|---|---|
| EP | 0340029 | 11/1989 |
| EP | 0605247 A2 | 7/1994 |
| WO | WO90/11641 | 10/1990 |
| WO | WO96/09683 | 3/1996 |

OTHER PUBLICATIONS

One page description entitled Two–Phase Reluctance–Type Semiconductor Motor; dated Jan. 18, 1988; inventor: Itsuki Ban; Appl. No. 61–151710.

One page description entitled Retarder; dated Feb. 15, 1989; inventor: Takayuki Suzuki; application No. 64–35500.

* cited by examiner

*Primary Examiner*—Nestor Ramirez
*Assistant Examiner*—Dang Dinh Le
(74) *Attorney, Agent, or Firm*—Kelly Bauersfeld Lowry & Kelley, LLP

(57) ABSTRACT

This switched reluctance machine has at least six magnet yokes (11) on the stator side. The yokes are placed circularly and they carry windings (112). These yokes (11) can be placed at the inner side and/or the outer side of the rotor (12). These yokes which are magnetically insulated to each other interact with the salient poles (121) of the rotor (12). The two phases (X, Y) of this machine are push-pull controlled by a Hall sensor (31). This way the electronic circuitry becomes very simple.

12 Claims, 2 Drawing Sheets

ELECTRONICALLY SWITCHED TWO PHASES RELUCTANCE MACHINE

The invention refers particularly to a motor according to the principle of an electronically switched reluctance machine, which is also known as a SR machine (called in English switched reluctance), which can be used as a D.C. motor and which can have an additional function as a generator.

The electromagnetic part (the stator) of the machine comprises an even number of electromagnets which are independent the one form each other and which are switched in such a way that they constitute two phases which are successively controlled.

A reluctance motor of this type is known from the international application PCT-RO 95/00012 (WO/96/09683).

This motor has a total of four electromagnets which are installed in opposite diametrical direction which constitutes the motor phases X and Y.

This machine produces the highest specific power referred to weight (W/kg) for a number of revolutions which is often too high for some applications (for example higher than 10000 revs/min).

From WO 90/11641, we know an electronically switched reluctance motor in which the stator has unregularly spaced poles which are combined in pairs. However, the poles of the rotor are regularly spaced from each other. The stator arrangement is configured so that reluctance paths between adjacent stator pole pairs are avoided so that no high switching frequencies are necessary.

The aim of the invention is to indicate types and examples for application of a simple, efficient and light reluctance machine with two phases which is appropriate for the fields of application where high power-weight ratios are required for a lower number of revolutions, hence for applications for which the delivered or picked-up torque (for generators) is high.

Because of its high performances and its low weight, this machine is particularly suitable for applications in the automobile industry.

Its use as a starter/generator for internal combustion engines is advantageous, whereby it can also have an additional function as an accessory drive. In this case, the rotor is connected with the flywheel of the internal combustion engine (or is configured as a part thereof), whereby the U-yokes are situated on the clutch housing.

Other fields of application are fan motors for the cooling fans of vehicles or in household, for example for washing machines.

This has the advantage that, even for a low number of revolutions, a high torque is available without torque decreases so that the reluctance machine according to the invention is particularly appropriate as a starter for internal combustion engines for motor vehicles.

BRIEF DESCRIPTION OF THE DRAWINGS

The accompanying drawing illustrates the invention. In such drawing.

DETAILED DESCRIPTION OF THE PREFERRED EMBODIMENT

Figure 1:
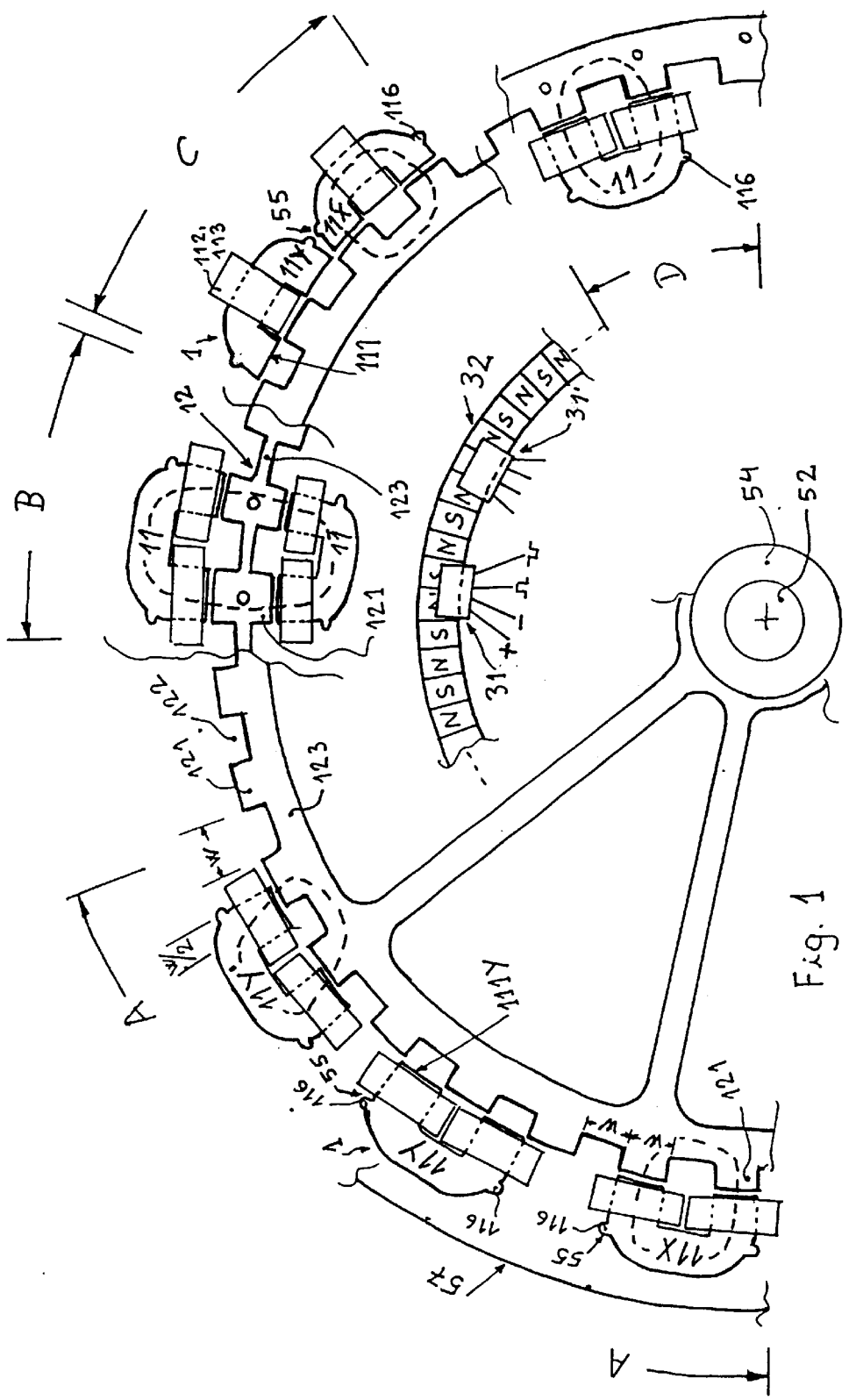
FIG. 1 is a schematic illustration showing an electronically switched reluctance motor or generator with two phases in accordance with the present invention, and illustrating four different embodiments A–D, having the same switch incrementation with but different U-yoke arrangements, and a magnet ring and Hall sensors.

The electromagnetic part (the stator) of this machine is designed with at least 6 yokes 11 which can be realized of different types, as may be seen in this specification.

The number of the yokes 11 per phase and their dimensioning are derived from an optimization principle, whereby economical and technological viewpoints are also taken into account.

As an optimization principle, a switching frequency is selected for which the power-weight ratio as well as the efficiency are optimal for the corresponding application. The optimal number of poles results from this frequency and the required number of revolutions.

The stator as well the rotor 12 of the electronically switched SR machine have salient poles.

As known by the prior art, the surface of a rotor pole 121 corresponds to the surface of a stator pole 111.

The stator is constituted by individual, magnetically insulated, U-shaped electromagnets 1 which support at least one winding.

These electromagnets 1 are preferably manufactured from a stack U-shaped punching sheet. The opening of both U-shaped limbs is approximately as wide as the width of a pole rotor tooth 1212, both have thus an angle extent which corresponds to the angle extent of a U-shaped limb or to the width of the limb (of a stator pole).

This angle w (switch incrementation) also determines the size and the number of the electromagnets 1 or the switching frequency for a predetermined rotational speed of the machine. The individual magnets 1 and the rotor poles 121 constitute the active parts of the two-phase machine.

FIG. 1 shows, on half a circle with four different areas A, B, C, D (so as to reduce the number of drawings), different embodiments of the yokes 11 with rotor poles 121 according to the invention, all with the same switch incrementation width w.

If we consider each of these alternatives A–D as if they were evenly realized on the whole periphery of the circle, namely with an even number of at least six yokes, we would obtain 4 alternatives for a machine, as follows:

A. A machine with external yokes 11, whereby each yoke supports two windings. (Moreover, in this arc of the circle, the relative position of the stator and rotor poles for the first phase X and the second phase Y are shown, as well as the position of a yoke 11Y' of the phase Y', which belong to a second machine which is connected to the first one and which is offset from the first one by w/2 so as to make the machine run more uniform.

Each phase is connected in series with at least one controllable semiconductor, preferably with a MOS-FET power transistor.

B. A machine with external as well as with internal yokes 11 and with a pot-shaped rotor 12.

C. A machine with external yokes 11 which support only one winding.

D. A machine with internal yokes 11.

Yokes with better properties (which, however, are more expensive) can be designed as would and cut cores such as the strip-wound cut anisotropic cores which are used for transformers. In this case, it is advisable not to place the yokes 11, as in FIG. 1 (successive sequences of both U-limbs sense of rotation), but distorted around 90° (simultaneous passing of the rotor poles which are also distorted around 90°, before the two U-limbs).

The plane of symmetry of the magnetic circuit is thus no longer diametral, but axial. Since the poles of the same sign of the U-electromagnets can be placed on the same side in axial direction, it concerns here a homopolar machine, the rotor of which can be produced of massive iron.

Because a two-phase SR machine has considerable torque fluctuations, it is advisable to use two machines, instead of one, with respectively half the required power, with an angle offset about w/2.

However, the two machines can have a common mechanical structure. Because the electromagnets can be placed at any place around the rotor, it is possible to use the same rotor 12 (in a correspondingly wider construction) for both machine halfs.

This means that half of the whole number of the electromagnets 1 are assigned to the first machine half with two phases X and Y, whereby the other magnets belong to the second machine half with the phases X'Y'. Thus, respectively one quarter of the existing electromagnets are assigned to each phase.

There is a correct function of the machine when the overlapping of the rotor (121) or stator poles 111 is selected such that, when the stator-rotor poles of the phase X correspond to each other (position tooth-tooth), the stator-rotor poles of the second phase are displaced around the angle w (position tooth-gap). The position of the phase magnets with respect to the angle w (=pole width,=gap width) is the following:

| Phase | Angular position |
|-------|------------------|
| X     | (0 + 2n)w        |
| Y     | (1 + 2n)w        |
| X'    | (0.5 + 2n)w      |
| Y'    | (1.5 + 2n)w      | whereby n is a whole number.

When fulfilling these conditions, the electromagnets 1 can be placed in any way around the rotor, also in the form of segments of a circle so as to use optimally the existing space.

Hereunder, we shall examine a simple machine with two phases—X and Y—and a total of n yokes 11, whereby a second machine, identical with the first one, with an angular displacement around w/2, placed beside the first one, is used for smoothing the torque.

The driving magnet circuit also comprises n/2 U-shaped magnet yokes 11X and n/2 magnet yokes 11Y, whereby the n yokes are identical.

Each yoke has two poles 11 which are directed toward the rotor, which accept the north or the south polarity when a current flows through the main windings 112 or through the secondary windings 113.

As may be seen on FIG. 1, when the two rotor poles 121 coincide with the two poles 111X of the yokes 11X, the other poles 111Y are situated opposite the pole gaps 122 of the rotor poles 121.

The rotor poles 121 are connected with each other by a common rotor yoke 123 so that these parts are merely molded out of the sheet stack of the rotor 12 which comprises punched electromagnetic sheet which has a round shape with indentation. These sheets are fixed to the motor shaft 52 directly or over additional parts. Windings (which are preferably prefabricated) are pushed onto the U-yokes, whereby each yoke has at least a main winding 112. These windings can be designed in a usual way with enameled wire, with or without wound body, for example with black enameled wire. However, according to the invention, a band winding is preferably used, namely made of an insulated or not insulated copper (or aluminum) band.

For the latter case, the main winding band is covered on one side with an insulating foil 115 (for example of polyester) which is slightly wider than the electrically conductive band so that short circuits occur between the spirally wound edges of the metallic winding band.

A particularly favorable solution is the simultaneous construction of the main winding 112 as well as of the secondary winding with a smaller section 113.

In this case, the winding bands which have the same width but which do not have the same thickness (and which have therefore a different section) are wound the one over the other, whereby they are separated by two insulating foils 115, 115'.

Respectively two of the described windings are pushed and fixed over the two limbs of the yokes 111 where they can be switched as required.

If we consider separately one yoke 11 and two rotor poles 121, together with the part of the yoke 123 which connects these poles, and when the two windings 112 are traversed by current, there results a magnetic flux which corresponds to the dotted line of FIG. 1. When the rotor poles 121 are not opposite the poles 111Y of the outer yokes (see FIG. 1) and when the yokes 11Y are fixed, the poles 111Y will attract the rotor poles 121, as a consequence of the current passage, whereby there results a torque which rotates the rotor 12 about an angle W.

For the control of the switching operations (rotor position acknowledgment), for example two Hall sensors 31, 31' are used which control respectively the phases X, Y and X', Y' of the two "motor halves".

The Hall sensors are switched over by a magnet ring 32 which jointly rotates with the rotor 12 and which has north poles, the angular position and the angular width of which corresponds to the width of the rotor poles, or of the south poles which correspond to the gaps between the rotor poles.

The transmitter magnet poles can be connected to a mechanical device with marked teeth and interstices. If the poles of the magnet disk 32 move the one after the other before the Hall sensor (with digital output), a logic signal "low" or "high" appears at its output, depending on the rotor position.

Moreover, through the change of the break-over point, a function of the reluctance machine as a generator can be effected. The break-over point is offset so that the motor is supplied with current (for the magnetic biasing) for a fraction of the switch incrementation w so that there results a sufficient magnetic circuit (Ampère number of turns).

The machine is thus adjusted in such a way that it brakes so that it absorbs mechanical energy which leads to the maintaining of the Ampère number of turns through current reversal. The inverse diodes which are situated in the Mos-Fet transistors will lead the excess energy to the source of current.

The operation as an A.C. generator can be reached when the yokes 11 are premagnetized through direct current feeding, whereby an alternating current is for example drawn on another winding. alternating current which results through magnetic flux change when the rotor poles move past the premagnetized stator poles.

Figure 3:
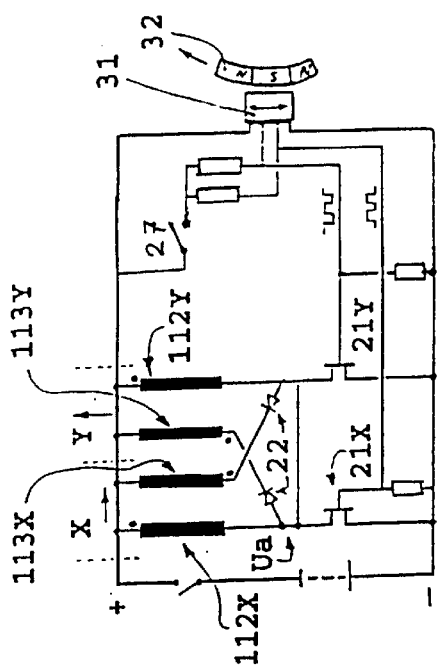
FIG. 3 is a electronic schematic of a control circuit used in accordance with the present invention.

The control circuit of the windings 112 and 113 mainly comprises two power transistors, preferably MOSFET field effect transistors 21X, 21Y, which are connected in series with the main windings 112X or 112Y, and the source of current which is external to the motor, see FIG. 3.

The windings 112 or 113X (or Y), which are situated on the U-yokes, can be connected in series or parallel, rectified dependently from the voltage level at which the motor is working.

The transistors 21X and 21Y are controlled through a simple electronic circuit by the Hall sensor with complementary output so that, if "high" exists at the direct output of the Hall sensor, the transistor 21X is conducting, and the transistor 21Y is conducting when the inverting output of the Hall sensor is "high".

The wound yokes 11X or 11Y are thus alternately magnetized so that a rotary field appears at the poles 111 which puts the rotor into motion.

FIG. 3 represents a complete circuit of an operative motor, whereby the points beside the windings 112 or 113 mark out the beginning of these windings; 112X are for example the n/2 main windings which can be connected in series or parallel which are situated on the n/2 yokes 11X.

However, in some cases (the selection can be made by a test), it is better if the current flow direction through the windings 112Y, 113Y is changed, i.e. if the points (the beginning of the winding) beside the Y-winding could be placed opposite in comparison with FIG. 3.

Here only two coupling diodes 22 are necessary which lead the self-inducing tension Ua to the beginning of the secondary winding 113.

When the switch 27 is closed, the direct or the complementary output of the Hall sensor 31 is fed with current and accepts a positive potential or it is connected to earth depending on the fact, if a north or a south pole of the magnet disk 32 is situated before the Hall sensor 31.

The complementary outputs of the Hall sensor (for example of the Allegro company, type UGN 3275) which are connected with the gate electrodes of the transistors 21X, 21Y have thus alternately a "high" or a "low" state so that they are conductive or closed in the same rhytm.

The harmful self-inducting tension Ua, which originate when disconnecting a winding, can be converted into a motive usable effect, if it is fed into the winding which is to be successively connected.

Figure 4:
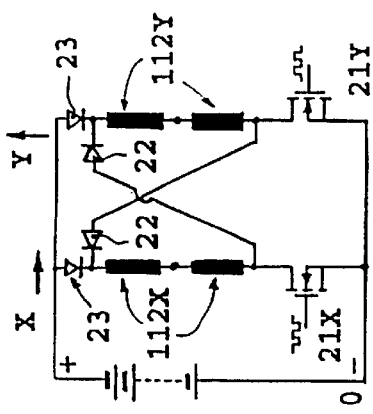
FIG. 4 is an electronic schematic of an alternative control circuit used in accordance with the present invention.
Figure 2:
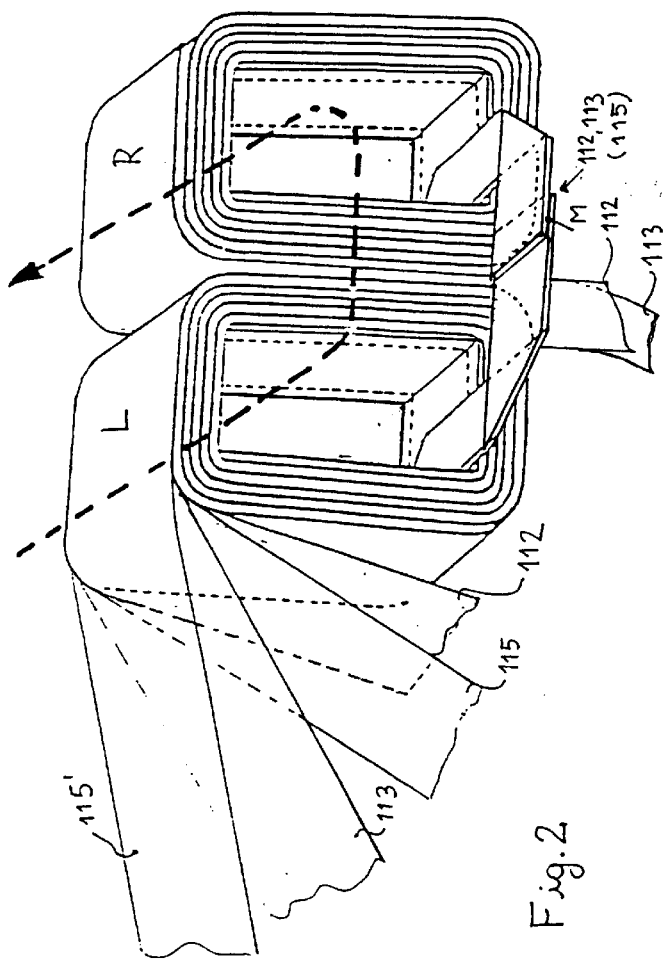
FIG. 2 is a perspective view of windings associated with the U-yokes of the motor or generator.

As may be seen in FIG. 4 (motor without secondary windings 113), this is here realized with the aid of the two coupling diodes 22 which lead the positive excess voltage, which originates when disconnecting the X-winding, to the winding 112Y or inversely. The decoupling diodes 23 avoid that the self-inducting tension Ua is led to the plus connection of the source of current.

However, this circuit has the disadvantage that the closing of the electric circuit of the self-inducting tension Ua is done by the transistors 21 or by the tension source. This disadvantage can be avoided using secondary windings 113 which are situated on the same yokes, see FIG. 3.

The self-inducting tension Ua originates from the winding 112Y (generator) and passes into the secondary winding 113Y of the yokes 11Y which serves as receivers.

With the aid of the self-inducting excess voltage Ua of the winding 112Y, thus an active current is produced in the windings 113Y, thus there results an useful magnetic flux in the yokes 111Y on which they are wound.

The rotor 12 is put into a continuous motion of revolution by the repeat of the above described eletromagnetic actions.

The optimization of the break-over point can practically result from the displacement of the Hall sensor 31 with respect to the yokes 11.

The magnetic and electric parts of the motor can be fixed in a containing frame.

The design of this frame can be carried out in very different ways; however, it mainly has recesses in which the yokes 11 and the bearing 54 of the motor shaft 52 are mounted.

The power transistors 21, the diodes 22 and 23 as well as other mechanical and electrical components (board, Hall sensor etc.) can be fixed as usual on this frame which serves as a cooler.

When the rotor poles 121 approximately coincide with the stator poles 111X, as represented on FIG. 1, their corresponding main windings 112X are disconnected, which directly leads to the occurence of the high self-inducting tension Ua which is transmitted to the secondary winding 113Y, whereby the main windings 112Y are fed from the source of current.

The poles 111Y assigned to these windings will be quickly magnetized and are thus able to attract the rotor poles 121 which are just moving away from the poles of the now disconnected yokes 11X.

The poles 111X (the yokes 11X) are fixed in such a way, so that this happens, that they begin to attract straight rotor teeth 121, when these teeth (121) have passed over the maximal overlapping with the poles 111Y.

A possibility to fulfill this condition is that the external angles of the poles 111Y are fixeddirectly in the vicinity of the external angles of the poles 111Y (see FIG. 1, section C).

The mounting of the yokes 11 is important (because of the small air gap between the rotor and the wound yoke) and has to be made very precisely.

As may be seen here, the yokes 11 have on both sides (eventually at two different distances from the shaft) recesses or semicircular humps 116 which can be fitted (vertically to the plane of the drawing) over appropriate counterparts 55 on the basic plate 57.

These counterparts represent a negative form of the above mentioned recesses 116 and are a part of a basic plate 57.

Thus the yoke are positively fixed radially, which guarantees an equal distance to the rotor 12 (a constant air gap), because the bearing 54 is also situated on the basic plate 57. The motor is operative with these components.

Before this position is reached, the logic levels at the output of the Hall sensor 31 vary so that the transistor 21X becomes conductive, while 21Y cuts off.

The already described operation are repeated and the rotor continuously rotates opposite the wound yokes.

The advantages of the invention consist in the fact that very high specific performances can be reached for a fixed desired number of revolutions and that the machine is simple and is carried out with parts which are used several times, which thus are appropriate for an automatized fabrication.

Function Mode

When the mode is connected to a power supply with the tension Un, a control voltage is applied to the gate electrode of the transistors 21 because of the signal level at the output of the Hall sensor 31.

The main winding 112Y is made alive and attracts the rotor 12 from the initial position represented in FIG. 1 by a rotation around the angle w to a position in which the poles 111Y–121 coincide. It thus comes from the relative position of the poles opposite the phase Y to a similar position, this time however opposite the phase X.

What is claimed is:

1. An electronically switched reluctance two phase motor or generator, comprising:
    a) a first two-phase machine half including:
        a movable unwound rotor including rotor poles evenly spaced on a periphery thereof so that a predetermined distance between two rotor poles corresponds with the width of each rotor pole and defines an angular segment (w) in a peripheral direction;
        a first stator arrangement including an even number of at least six U-yokes arranged independently on a stator, each U-yoke carrying windings having two magnetic poles which cooperate over an air gap with the rotor, the U-yokes being connected to either a X or Y phase having an electrical offset of approximately 180°; and
        diodes for selectively transmitting demagnetization energy to either the X or Y phase; and
    b) a second two-phase machine half independently operative from the first machine half and arranged relative to the first machine half according to an offset angle and including:
        a movable unwound rotor including rotor poles evenly spaced on a periphery thereof so that a predetermined distance between two rotor poles corresponds with the width of each rotor pole and defines an angular segment (w) in a peripheral direction;
        A second stator arrangement including an even number of at least six U-yokes arranged independently on a stator, each U-yoke carrying windings having two magnetic poles which cooperate over an air gap with the rotor, the U-yokes being connected to either a X' or Y' phase having an electrical offset of approximately 180°, and
        diodes for selectively transmitting demagnetization energy to either the X' or Y' phase;
            wherein the U-yokes of the first machine half are arranged offset in a peripheral direction with respect to the U-yokes of the second machine half.

2. An electronically switched reluctance motor or generator according to claim 1, wherein the U-yokes are arranged in such a way that they fulfill the following angular conditions, the U-yokes of the X-phase are in the angular position (0+2n)w, the U-yokes of the Y-phase are in the angular position (1+2n)w, the U-yokes of the X'-phase are in the angular position (0.5+2n)w and the U-yokes of the Y'-phase are in the angular position (1.5+2n)w, whereby n is an even number.

3. An electronically switched reluctance motor or generator according to claim 1, wherein the U-yokes are arranged on both sides of the rotor.

4. An electronically switched reluctance motor or generator according to claim 1, wherein the U-yokes are arranged unevenly on only portions of the rotor periphery.

5. An electronically switched reluctance motor or generator according to claim 1, wherein the yokes are arranged in such a way that the plane of symmetry of the magnet circuit is axial.

6. An electronically switched reluctance motor or generator according to claim 1, wherein both machine halves have a common rotor.

7. An electronically switched reluctance motor or generator according to claim 1, wherein both machines halves have a common mechanical structure.

8. An electronically switched reluctance motor or generator according to claim 1, wherein a change of function between the motor and the generator function occurs over a shift of a switching point.

9. An electronically switched reluctance motor or generator according claim 1, wherein the stator poles are premagnetized with direct current to function as an A.C. generator.

10. An electronically switched reluctance motor or generator according to claim 1, including first and second phase windings associated with the U-yokes that are arranged in such a way that a current conduction direction in the first phase windings is equal or opposite to a current conduction direction in the second phase windings.

11. An electronically switched reluctance motor or generator according to claim 1, including a motor position sensing magnet with teeth and gaps configured thereon.

12. An electronically switched reluctance motor or generator according to claim 1, wherein the motor has a pre-selected number of yokes so that a weight coefficient and efficiency reach a predetermined value.

* * * * *